US012277453B2

(12) United States Patent
Oza et al.

(10) Patent No.: US 12,277,453 B2
(45) Date of Patent: Apr. 15, 2025

(54) APPLICATION MANAGEMENT USING INFORMATION CAPTURED VIA EMULATING EXECUTION OF TASKS IN GRAPHICAL USER INTERFACES

(71) Applicant: Virtustream IP Holding Company LLC, Bethesda, MD (US)

(72) Inventors: Chirag Oza, Richmond, TX (US); Jignesh Patel, Calgary (CA); Nalin Shah, Duluth, GA (US); Diptiman Mukherjee, Bengaluru (IN); Siddesh K. Gunaji, Bengaluru (IN); Sitaram Kotnis, Bangalore (IN)

(73) Assignee: Virtustream IP Holding Company LLC, Bethesda, MD (US)

( * ) Notice: Subject to any disclaimer, the term of this patent is extended or adjusted under 35 U.S.C. 154(b) by 777 days.

(21) Appl. No.: 17/380,428

(22) Filed: Jul. 20, 2021

(65) Prior Publication Data
US 2022/0391261 A1    Dec. 8, 2022

(30) Foreign Application Priority Data

Jun. 7, 2021   (IN) ............................. 202141025219

(51) Int. Cl.
   *G06F 9/46*      (2006.01)
   *G06F 9/445*     (2018.01)
   (Continued)

(52) U.S. Cl.
   CPC ........ *G06F 9/5088* (2013.01); *G06F 9/44505* (2013.01); *G06F 9/45529* (2013.01); *G06F 9/4881* (2013.01); *G06F 9/5077* (2013.01)

(58) Field of Classification Search
   CPC ............... G06F 9/5088; G06F 9/44505; G06F 9/45529; G06F 9/4881; G06F 9/5077
   See application file for complete search history.

(56) References Cited

U.S. PATENT DOCUMENTS

| 10,963,731 B1 * | 3/2021 | Sarkar ................. G06F 11/3688 |
| 2009/0198769 A1 * | 8/2009 | Keller ................. G06F 9/44536 |
| | | 709/203 |

(Continued)

OTHER PUBLICATIONS

SAP, "SAP GUI Scripting API," Developer Guide, Document Version: 7.60, Mar. 28, 2019, 302 pages.

(Continued)

*Primary Examiner* — Tammy E Lee
(74) *Attorney, Agent, or Firm* — Ryan, Mason & Lewis, LLP (57) ABSTRACT

An apparatus comprises a processing device configured to receive a request to collect configuration information for a source application and to establish a connection to an application session associated with the source application. The processing device is also configured to emulate, via the application session, execution of tasks in the source application, wherein emulating the execution of at least one of the tasks comprises automatically navigating to at least one view of a graphical user interface of the source application and executing at least one function that updates an output of the at least one view. The processing device is further configured to capture at least a portion of the configuration information for the source application from the output of the at least one view, and to perform one or more management actions for the source application utilizing the captured portion of the configuration information.

20 Claims, 5 Drawing Sheets

(51) Int. Cl.
*G06F 9/455* (2018.01)
*G06F 9/48* (2006.01)
*G06F 9/50* (2006.01)

(56) References Cited

U.S. PATENT DOCUMENTS

2013/0332442 A1* 12/2013 Liu .................... G06Q 30/0267
 707/709
2020/0304571 A1* 9/2020 Ranjan ................ G06F 3/0649
2021/0390010 A1* 12/2021 Moessle ................ G06N 20/00

OTHER PUBLICATIONS

System Overload, "SAP Transaction Codes," https://www.system-overload.org/sap/transaction-codes.html, Accessed Jul. 16, 2021, 2 pages.
SAP Brains Online, "All about transaction codes in SAP," https://sapbrainsonline.com/help/transaction-codes-in-sap.html, Accessed Jul. 16, 2021, 11 pages.

* cited by examiner

APPLICATION MANAGEMENT USING INFORMATION CAPTURED VIA EMULATING EXECUTION OF TASKS IN GRAPHICAL USER INTERFACES

FIELD

The field relates generally to information processing, and more particularly to techniques for managing information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult to provision cloud services in multi-cloud environments.

SUMMARY

Illustrative embodiments of the present disclosure provide techniques for application management using information that is captured via emulating the execution of tasks in a graphical user interface of an application.

In one embodiment, an apparatus comprises at least one processing device comprising a processor coupled to a memory. The at least one processing device is configured to perform the steps of receiving a request to collect configuration information for a source application and establishing a connection to an application session associated with the source application. The at least one processing device is also configured to perform the step of emulating, via the application session associated with the source application, execution of two or more tasks in the source application, wherein emulating the execution of at least one of the two or more tasks comprises automatically navigating to at least one view of a graphical user interface of the source application and executing at least one function that updates an output of the at least one view. The at least one processing device is further configured to perform the steps of capturing at least a portion of the configuration information for the source application from the output of the at least one view, and performing one or more management actions for the source application utilizing the captured portion of the configuration information for the source application.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
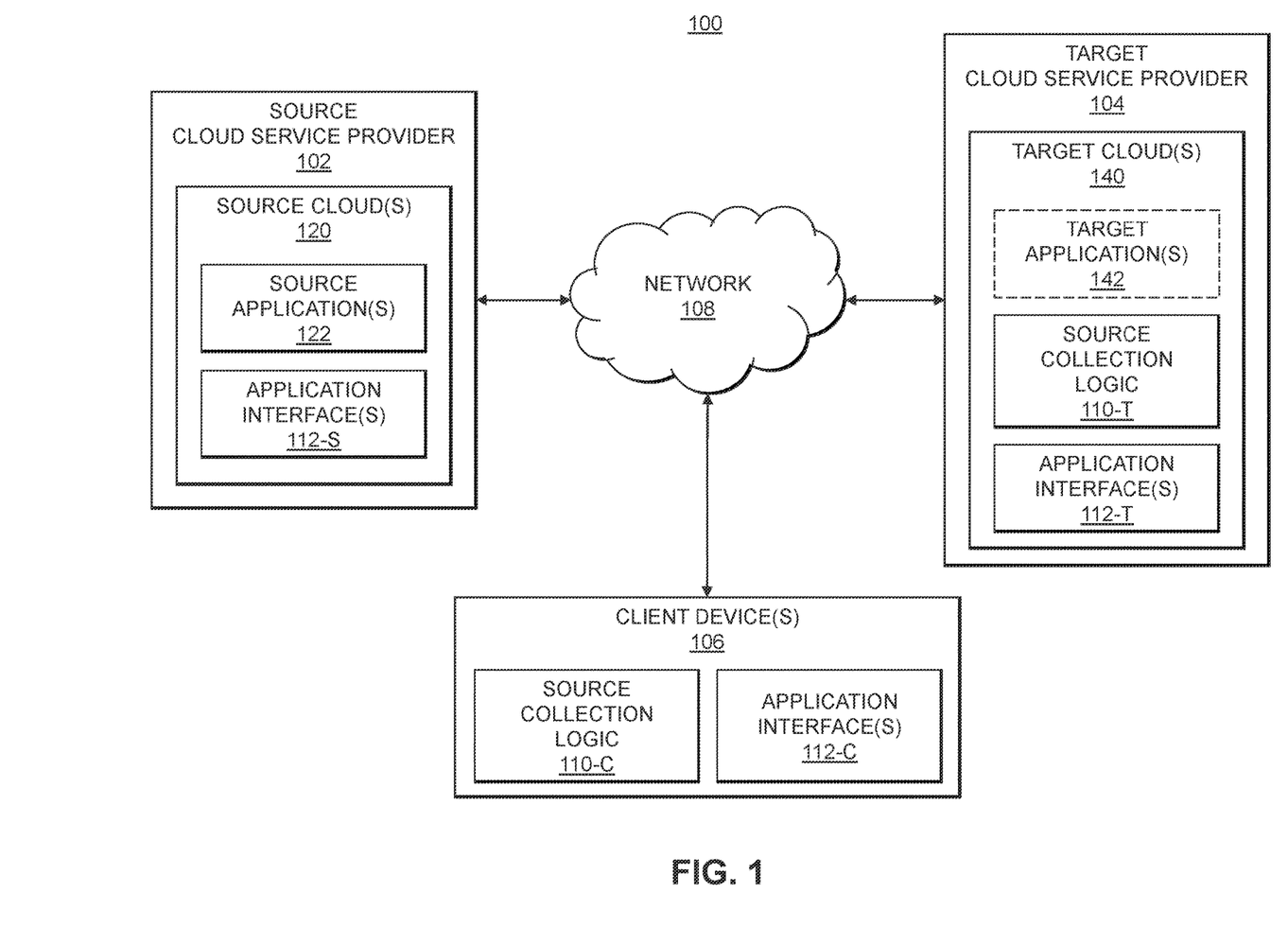
FIG. 1 is a block diagram of an information processing system configured for application management using information that is captured via emulating the execution of tasks in a graphical user interface of an application in an illustrative embodiment.

FIG. 1 shows an information processing system 100 configured in accordance with an illustrative embodiment. The information processing system 100 is assumed to be built on at least one processing platform and provides functionality collecting information used for application management. The information processing system 100 includes a source cloud service provider (CSP) 102, a target CSP 104 and one or more client devices 106 that are coupled via a network 108. The source CSP 102 operates one or more source clouds 120 on which one or more source applications 122 run, and the target CSP 104 operates one or more target clouds 140. In some embodiments, the source applications 122 are to be migrated from the source clouds 120 of the source CSP 102 to the target clouds 140 of the target CSP 104 as target applications 142.

The target CSP 104 and client devices 106 in the FIG. 1 embodiment implement respective instances of source collection logic 110-T and 110-C (collectively, source collection logic 110). The source collection logic 110, as will be described in further detail below, is configured to provide functionality for collecting information related to the source applications 122. Such collected information may be utilized for various purposes. In some embodiments, the collected information is used to migrate the source applications 122 to the target applications 142 running on the target clouds 140 of the target CSP 104, or for provisioning the target applications 142. The collected information may also or alternatively be provided to an operator of an enterprise system (e.g., such as the target CSP 104) that provides monitoring, management or other support services for end-users of the source applications 122. As part of collecting information from the source applications 122, the source collection logic 110 may make use of at least one of: one or more application interfaces 112-S operating on the source clouds 120 of the source CSP 102; one or more application interfaces 112-T operating on the target clouds 140 of the target CSP 104; and one or more application interfaces 112-C operating on the client devices 106. The application interfaces 112-S, 112-T and 112-C are collectively referred to herein as application interfaces 112.

The source clouds 120 of the source CSP 102 and the target clouds 140 of the target CSP 104 are examples of what is more generally referred to herein as information technology (IT) infrastructure. Such IT infrastructure may include various assets (e.g., physical and virtual computing resources). Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. In some embodiments, the source clouds 120 and target clouds 140 are part of one or more enterprise systems. As used herein, the term "enterprise system" is intended to be construed broadly to include any group of systems or other computing devices. For example, the assets of IT infrastructure used to implement the source clouds 120 and/or target clouds 140 may provide a portion of at least one enterprise system. A given enterprise system may also or alternatively include one or more of the client devices 106. In some embodiments, the source clouds 120 and target clouds 140 or portions thereof are part of a same enterprise system. In other embodiments, the source clouds 120 and target clouds 140 or portions thereof are associated with different enterprise systems.

The client devices 106 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 106 may also or alternately comprise virtualized computing resources, such as VMs, containers, etc.

The client devices 106 in some embodiments comprise respective computers associated with a particular company, organization or other enterprise. Thus, the client devices 106 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 108 is assumed to comprise a global computer network such as the Internet, although other types of networks can be part of the network 108, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the source clouds 120 of the source CSP 102, the target clouds 140 of the target CSP, and the client devices 106, as well as to support communication between these entities and other related systems and devices not explicitly shown.

As noted above, the source clouds 120 of the source CSP 102, the target clouds 140 of the target CSP 104 and the client devices 106 implement respective application interfaces 112-S, 112-T and 112-C collectively referred to as application interfaces 112. In some embodiments, the application interfaces 112 comprise host agents or application programming interfaces (APIs) configured for automated access to other entities in the information processing system 100. For example, the application interfaces 112-T and/or 112-C may be used to access source applications 122 (possible via the application interfaces 112-S) to collect and transmit information associated with the source applications 122. This may include using the application interfaces 112 to automatically navigate to different menus, pages, dialog boxes, screens or other views of graphical user interfaces (GUIs) provided by the source applications 122. Thus, the source collection logic 110 can use the application interfaces 112 to automatically navigate to desired views in the GUIs of the source applications 122 that contain information to be collected. Such information may then be captured (e.g., using screenshotting functionality) and saved, to be used as described elsewhere herein.

It should be understood that "automatically" navigating to a particular view in a GUI does not require any specific manual user input. Consider a complex GUI that includes various user interface features (e.g., menus, submenus, links, dialog boxes, etc.) that allow a user to navigate from a main or default view to a specific desired view. Depending on the complexity of the GUI, getting to the specific desired view may require manual activation of a potentially complex sequence of such user interface features which is a time-consuming manual task, and which may require that the user have significant knowledge, expertise or familiarity with the user interface features utilized by the GUI. The source collection logic 110 is configured to automate this procedure, enabling navigation to specific desired views directly and automatically (e.g., through the use of shortcuts which enable programmatic navigation within the GUI) without requiring any manual input (e.g., a user manually activating a potentially complex sequence of user interface features of the GUI).

As noted above, the target clouds 140 of the target CSP 104 and/or the client devices 106 may implement respective instances of source collection logic 110 configured to collect information from the source applications 122. Although shown as an element of both the target clouds 140 of the target CSP 104 (as source collection logic 110-T) and the client devices 106 (as source collection logic 110-C), this is not a requirement. In other embodiments, the source collection logic 110 may be implemented solely via the target clouds 140 of the target CSP 104, solely via the client devices 106, or solely in another entity (e.g., such as a cloud service which may operate on clouds of a CSP that is distinct from both the source clouds 120 of the source CSP 102 on which the source applications 122 run as well as the target clouds 140 of the target CSP 104 on which the target applications 142 run), or may run on various combinations thereof.

The various information collected from the source applications 122 using the source collection logic 110 may be stored in a database or other data store implemented using one or more storage systems or devices associated with the target clouds 140 of the target CSP 104, the client devices 106, etc. In some embodiments, one or more of the storage systems utilized to implement such a database or other data store comprises a scale-out all-flash content addressable storage array or other type of storage array. The term "storage system" as used herein is intended to be broadly construed, and should not be viewed as being limited to flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The source collection logic 110 in the FIG. 1 embodiment is assumed to be implemented using at least one processing device. Each such processing device generally comprises at least one processor and an associated memory. The source collection logic 110 may be implemented at least in part in the form of software that is stored in the memory and executed by the at least one processor.

It is to be appreciated that the particular arrangement of the source CSP 102, source clouds 120, source applications 122, target CSP 104, target clouds 140, target applications 142, client devices 106, network 108, source collection logic 110 and application interfaces 112 illustrated in the FIG. 1 embodiment is presented by way of example only, and alternative arrangements can be used in other embodiments. As discussed above, for example, the source collection logic 110 may be implemented solely in either the target clouds 140 of the target CSP 104 or the client devices 106, or at least in part on one or more other servers, clouds, etc.

It is to be understood that the particular set of elements shown in FIG. 1 for collecting information from the source applications 122 is presented by way of illustrative example only, and in other embodiments additional or alternative elements may be used. Thus, another embodiment may include additional or alternative systems, devices and other network entities, as well as different arrangements of modules and other components.

The source collection logic 110, application interfaces 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The source clouds 120 of the source CSP 102, the target clouds 140 of the target CSP 104 and the client devices 106 or components thereof (e.g., the source collection logic 110 and application interfaces 112) may be implemented on respective distinct processing platforms, although numerous other arrangements are possible. For example, in some embodiments at least portions of the client devices 106 and the target clouds 140 of the target CSP 104 are implemented on the same processing platform. A given one of the client devices 106 can therefore be implemented at least in part within at least one processing platform that implements at least a portion of the target clouds 140 of the target CSP 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the source clouds 120 of the source CSP 102, the target clouds 140 of the target CSP 104, the client devices 106, or portions or components thereof, to reside in different data centers. Numerous other distributed implementations are possible. The source collection logic 110 can also be implemented in a distributed manner across multiple data centers.

Additional examples of processing platforms utilized to implement the information processing system 100 in illustrative embodiments will be described in more detail below in conjunction with FIGS. 4 and 5.

It is to be appreciated that these and other features of illustrative embodiments are presented by way of example only, and should not be construed as limiting in any way.

An exemplary process for application management using information that is captured via emulating the execution of tasks in a GUI of an application will now be described in more detail with reference to the flow diagram of FIG. 2. It is to be understood that this particular process is only an example, and that additional or alternative processes for application management using information that is captured via emulating the execution of tasks in a GUI of an application may be used in other embodiments.

In this embodiment, the process includes steps 200 through 208. These steps are assumed to be performed by the target CSP 104 and/or one or more of the client devices 106 utilizing the source collection logic 110 and the application interfaces 112. The process begins with step 200, receiving a request to collect configuration information for a source application (e.g., one of the source applications 122). The source application may be assumed to be run external to a processing device that performs the FIG. 2 process (e.g., external to the processing device that is running the source collection logic 110). The request may specify a target path where the configuration information for the source application is to be saved, access credentials for the source application, etc.

In step 202, a connection to an application session associated with the source application is established. Step 202 may utilize one or more scripting libraries associated with a GUI of the source application. Execution of two or more tasks in the source application is emulated via the application session associated with the source application in step 204. Emulating the execution of at least one of the two or more tasks comprises automatically navigating to at least one view of a graphical user interface of the source application and executing at least one function that updates an output of the at least one view. At least a portion of the configuration information for the source application is captured from the output of the at least one view in step 206.

The source application may comprise a plurality of instances operating on respective ones of a plurality of application servers, and emulating the execution of the two or more tasks in the source application in step 204 may comprise emulating the execution of at least a given one of the two or more tasks on each of the plurality of application servers. Step 204 may include emulating execution of a sequence of two or more transaction codes via the application session associated with the source application.

Capturing at least a portion of the configuration information for the source application in step 206 may comprise capturing a screenshot of the at least one view following execution of the at least one function that updates the output of the at least one view. Step 202 may include configuring one or more parameters of the application session that maintain the GUI of the source application in a full screen mode for capturing the screenshot, that select a graphical theme of the GUI of the source application that facilitates capturing the screenshot, combinations thereof, etc. Step 202 may further include closing any other existing application sessions associated the source application (e.g., to prevent artifacts or other disruption of screenshot captures).

Figure 2:
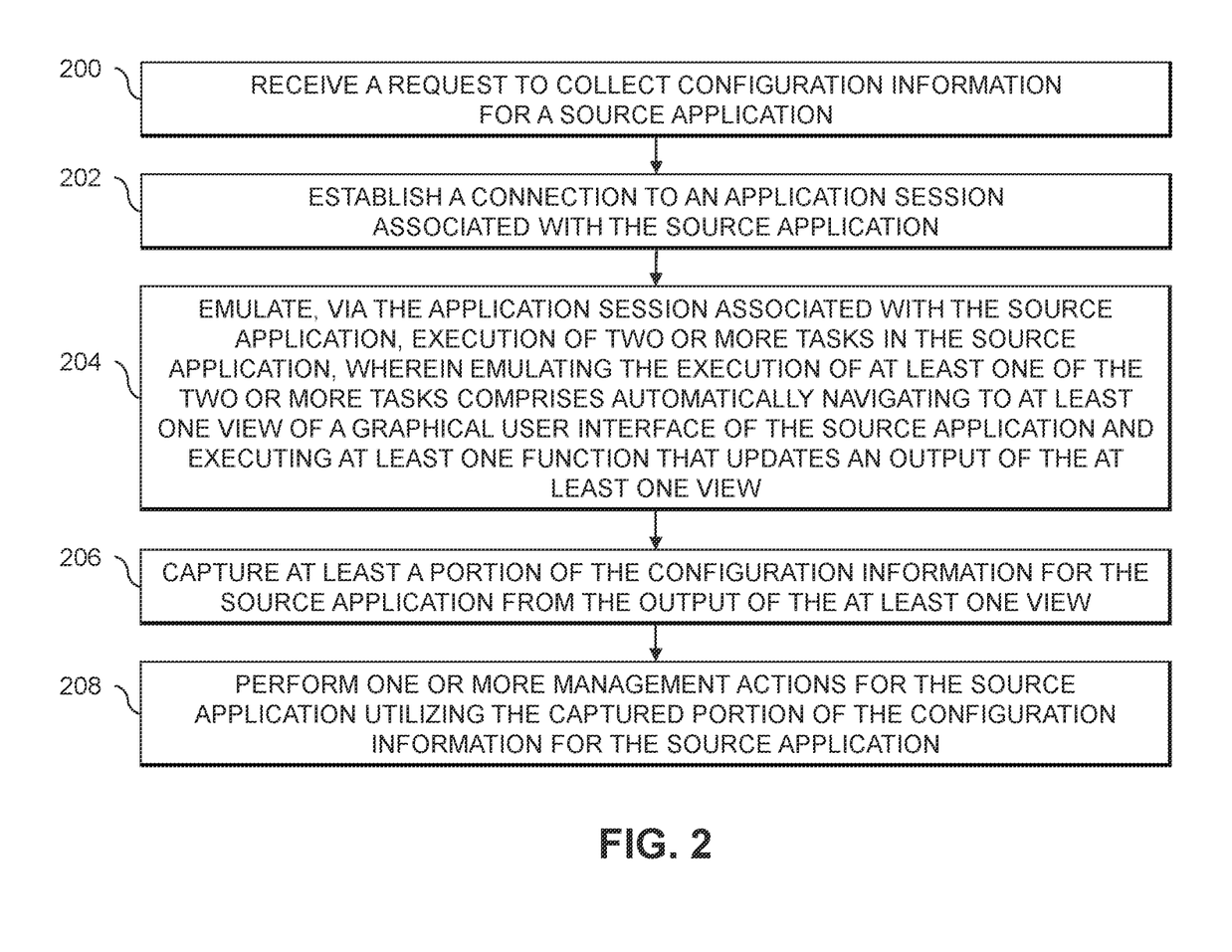
FIG. 2 is a flow diagram of an exemplary process for application management using information that is captured via emulating the execution of tasks in a graphical user interface of an application in an illustrative embodiment.

The FIG. 2 process continues with step 208, performing one or more management actions for the source application utilizing the captured portion of the configuration information for the source application. Step 208 may include transmitting the captured portion of the configuration information to a support platform providing support services for the source application. Step 208 may also or alternatively include performing migration of the source application from a source computing resource to a target computing resource. The source computing resource may comprise a first cloud operated by a first CSP and the target computing resource may comprise a second cloud operated by a second CSP. Step 208 may further or alternatively include provisioning a target application at the target computing resource. The source application may comprise a first piece of software and the target application may comprise a second piece of software different than the first piece of software.

An enterprise system (e.g., which may be a CSP operating one or more clouds) may provide various services to end-users. Such services may include, for example, collecting and understanding information associated with various third-party applications, including Enterprise Resource Planning (ERP) software such as that provided by SAP®. Such collected information may be referred to herein as information of a "source" system, software or application. Various embodiments are described below in the context of a first entity that is an operator of an enterprise system and provides various services to end-users, where the end-users utilize some system, software or application that is provided by a third-party. As an example, Virtustream® (VS) may collect information associated with third-party applications (e.g., ERP software such as that provided by SAP®) utilized by its end-users. Such information may be used in VS Professional Services processes, to provide support and other management for its end-users' third-party applications that are not hosted by or under the control of VS.

Conventional approaches to collecting information from such third-party applications suffer from a number of disadvantages. For example, conventional approaches are typically manual processes, which are cumbersome and time-consuming thus impacting cost and efficiency. Manual collection processes may require an end-user to manually browse through various parts of a third-party application (e.g., ERP software such as that provided by SAP®) to gather needed information. The information, once gathered, must be input into one or more files, and then such files would need to be sent to the party that needs such information (e.g., an operator, such as VS, of an enterprise system providing support, monitoring, management or other services to the end-user). Such manual collection processes rely on the end-user accurately following documented steps or procedures for gathering all of the required information. There is thus a chance or risk that the end-user may miss out on some data (e.g., due to human error). This may be a common risk where the end-user is not an expert with the third-party application from which the information is to be collected, or where the third-party application is complex. In some cases, an end-user may delegate the task of gathering information related to third-party applications to the enterprise system (e.g., VS) that provides support, monitoring, management or other services to the end-user. This, however, requires the end-user to give the enterprise system access to the third-party applications. For various reasons (e.g., security concerns, delays with obtaining necessary security clearance, connectivity issues, etc.), end-users may be hesitant to give the enterprise system access to the third-party applications.

Illustrative embodiments provide techniques for automating such data collection to facilitate management of such third-party applications by an enterprise system. Management of the third-party applications may include, but is not limited to, monitoring operation of the third-party applications, providing support for the third-party applications, migrating the third-party applications (e.g., from source clouds 120 of the source CSP 102 to the target clouds 140 of the target CSP 104), etc. In some embodiments, such information collection is performed using the source collection logic 110, which may be embodied as a script or other type of executable that requires minimal input from the end-user (e.g., a few clicks). This is particularly useful where the end-user may have a large number of systems or instances of third-party applications from which information is to be collected. For example, a single third-party application may run as part of a system where instances of the third-party application or portions thereof run on multiple application servers. Use of the source collection logic 110 (e.g., a script or other executable) can reduce or eliminate dependencies on manual processes, which are subject to human error, process latencies, etc.

The advantages of automating information collection are significant. Consider, as an example, an end-user that runs ERP software or another type of third-party application which includes multiple instances running on different systems (e.g., application servers). To gather required information in such a case, a conventional manual process might require an end-user to login to each system running an instance of that third-party application and manually capture information from different portions or sections of that application (e.g., from different screens or views of a GUI thereof). This may require the end-user to login to each system and capture 20 or more screenshots. The automated processes described herein can greatly reduce the time and complexity needed for collecting information from third-party applications. For example, a script or other executable providing the source collection logic 110 may in some embodiments require minimal input from the end-user (e.g., a specified location where collected data should be saved, a security identifier (SID) or other credentials, confirmation that the script or other executable is allowed to run on the end-user system, etc.). Once such input is provided by the end-user, the script or other executable providing the source collection logic 110 can take less than five minutes to collect the desired information and save it to the specified location.

The source collection logic 110, as noted above, may be implemented as a script or other executable file that is run on one of the client devices 106 (e.g., as source collection logic 110-C) utilized by the end-user of a given one of the source applications 122 from which information is to be collected. In the discussion below, the given source application 122 from which the information is to be collected is assumed to comprise ERP software such as that provided by SAP®. The source collection logic 110 may make use of application interfaces 112 that are exposed by or provide access to the given source application 122. In some embodiments, the application interfaces 112 include a GUI (e.g., such as SAPGUI for SAP® software). More particularly, the source collection logic 110 may use scripting libraries of the application interfaces 112 (e.g., SAPGUI scripting libraries for SAP® software) to connect to an application session (e.g., an existing SAPGUI session) for the given source application 122.

Once the source collection logic 110 connects to an application session for the given source application 122 (e.g., the existing SAPGUI session), the source collection logic 110 may emulate the manual execution of various actions to automatically navigate to parts of the given source application 122 which contain information that is to be collected. The given source application 122 may include a potentially complex GUI that is difficult and time-consuming to navigate manually, particularly as the information to be collected may be scattered across multiple different sections, pages or views of the GUI. The source collection logic 110 can emulate the manual navigation of such a complex GUI to get to the sections, pages or views of the GUI that contain the information to be collected.

In some embodiments, the given source application 122 comprises ERP software provided by SAP®, and the above-described emulation of manual navigation of the given source application 122 is achieved through the use of multiple Business Application Software Integrated Solution (BASIS) transaction codes (t-codes). T-codes may be viewed as providing "shortcuts" for various tasks, including navigating to particular menus, dialog boxes, tables, section, pages or other views of the GUI that contain different information. T-codes may be used to access various functions or running programs (e.g., to get access to custom applications, predefined processes, etc.). T-codes, for example, may be used to automatically navigate to particular screens of the given source application 122 in order to obtain screenshots of desired information. The use of the t-codes allows bypassing menus of the given source application 122 to quickly and automatically navigate to a view where desired information is displayed.

The source collection logic 110 may execute a sequence of t-codes (or other types of navigation shortcuts) taking screenshots of the information displayed as a result of execution of each of the t-codes. Such screenshots are then placed into a desired location (e.g., a user-specified directory that is input when the script or other executable providing the source collection logic 110 is opened or run by the end-user). It should be appreciated that while various embodiments are described with respect to the source collection logic 110 using screenshot functionality to capture desired information, other techniques may be used. For example, some information to be captured may be saved in various other forms (e.g., spreadsheets, text files, comma separated value (CSV) files, extensible markup language (XML) files, etc.).

The source collection logic 110 captures instance information for the given source application 122. If the given source application 122 has multiple instances (e.g., ERP software that has instances running on multiple application servers), the source collection logic 110 may emulate the manual navigation of the interface of the given source application 122 for each instance or application server (e.g., through execution of selected application server-specific t-codes individually on each application server by emulating a "double-click" action on each application server that is listed in the view produced by running the SM51 t-code described in further detail below).

The particular type of t-codes which may be emulated and run by the source collection logic 110 may vary as desired for a particular implementation. The particular t-codes utilized may also be based on the release or version of the given source application 122 that is run by the end-user. Various illustrative examples of such t-codes and associated information which may be captured in some embodiments will now be described.

RZ10 is a transaction code used for viewing profile information, including profile parameter values;

RZ11 is a transaction code used for viewing dynamic profile information, including profile parameter values that are temporarily changed;

SLICENSE is a transaction code used for viewing license information;

SECSTORE is a transaction code used for viewing information related to key status in secure storage;

SCC4 is a transaction code used for viewing client-specific catalogs;

OSS1 is a transaction code used for displaying information for network connection proxies (e.g., intermediate stations or proxies (SAProuter) between SAP systems and between SAP systems and external networks);

SPAM is a transaction code used for viewing support package information, including an overview of the status of imported queues in a package manager;

ST22 is a transaction code used for listing generated errors (e.g., in the form of SAP Advanced Business Application Programming (ABAP) dumps);

STMS is a transaction code used for displaying information associated with a Transport Management System (TMS) in SAP;

ST03N is a transaction code used for viewing workload monitoring information;

RTCCTOOL is a transaction code used for viewing notifications of actions that need to be taken in a system for a service preparation check;

SMLT is a transaction code used for viewing languages used or installed in the SAP system;

SLDAPICUST is a transaction code used for viewing SAP System Landscape Directory (SLD) information, including configuration of hosts and port names;

SLDAPICHECK is a transaction code used for viewing SLD API information;

RZ70 is a transaction code used for viewing SLD configuration information;

SLDCHECK is a transaction code used for viewing connectivity information for SLDs;

SMLG is a transaction code used for viewing logon group information;

RZ04 is a transaction code used for viewing SAP instances information, including operation modes for SAP instances;

SM61 is a transaction code used for viewing server group information;

SM65 is a transaction code used for viewing background process information;

RZ12 is a transaction code used for viewing remote function call (RFC) server group assignment information;

STRUSTSSO2 is a transaction code used for viewing key information, including public-key certificates for personal security environments (PSEs);

SNRO is a transaction code used for viewing number range information, including number ranges for business and application-specific number ranges;

SSO2 is a transaction code used for viewing single sign-on (SSO) information, including SSO information for workplaces;

DB02 is a transaction code used for viewing database statistics;

SM37 is a transaction code used for viewing background and batch jobs running in the SAP system;

SE16 is a transaction code used for viewing table information, including contents or data stored in different fields in tables;

RZ03 is a transaction code used for viewing application server information, including an overview of application servers;

ST02 is a transaction code used for viewing memory resource information for application servers;

SM51 is a transaction code used for viewing active application servers, including status, users and work processes in the active application servers;

AL11 is a transaction code used for viewing directory information, including file systems and other directory parameters;

SICK is a transaction code used for viewing system inconsistency information, including initial consistency check information;

ST06 is a transaction code used for viewing operating system information, including various server or system capacity and utilization information;

SMGW is a transaction code used for viewing gateway information, including gateway monitoring information;

SMICM is a transaction code used for viewing Internet connection information, including monitoring data for an Internet Communication Manager (ICM);

SM21 is a transaction code used for viewing system log information, including critical log entries, system errors, warning, user locks, and process messages;

SCOT is a transaction code used for viewing messages sent using a communication interface between SAP systems and between an SAP system and external systems, including SAPconnect communication interface information;

STZAC is a transaction code used for viewing client time zone information; SE14 is a transaction code used for viewing database table information, including temporary table information; and SA38 is a transaction code used for viewing program information, including customized program information.

It should be appreciated that the above-described t-codes are presented by way of example only, and that embodiments are not limited solely to use with these specific t-codes. It should be further appreciated that in other embodiments (e.g., where the given source application 122 from which information is to be captured is not an SAP application), the discovery executable or script may use other types of shortcuts (e.g., instead of t-codes) to automatically navigate to particular screens or views containing application information to be captured.

In addition to using one or more of the above-described t-codes, some embodiments may further obtain various table information from the given source application 122. Such table information may include, but is not limited to: a CVERS table containing release status information of software components; a TAORA table containing data class relationship information; an IORA table containing index tablespace information; an UMGPOCNV table containing table pools information; a system product list table; a system component list table; an RFC connections table; etc.

In some embodiments, as a prerequisite to running the source collection logic 110 (e.g., which may be embodied as a script or other executable), an end-user (e.g., of one of the client devices 106 running source collection logic 110-C, or the target clouds 140 running source collection logic 110-T) can login to the system (e.g., an 000/productive client) with a user account having access to the information that is to be collected (e.g., access to the various t-codes described above, including t-codes SE16 and SA38). This may include setting various control parameters for the application interfaces 112 that will be used to collect information. As noted above, where the given source application 122 is an SAP application the application interfaces 112 may comprise SAPGUI. The parameter "sapgui/user_scripting" should be set to TRUE in the system to allow the source collection logic 110 to run. If the default value is FALSE, it can be changed dynamically to TRUE. In such a scenario, however, the end-user may need to logoff after the parameter change and log back in so that the parameter change goes into effect. SAPGUI scripting should also be enabled via the SAP Logon pad.

The theme or visual display option parameters used for the application interfaces 112 may also be set to facilitate information collection. Continuing with the example of the given source application 122 being an SAP application, a particular theme for the SAPGUI may be selected to provide clear screenshot captures. In some embodiments, a "Blue Crystal" theme for the SAPGUI may be recommended for screenshot captures, as other themes (e.g., Fortified) may lead to erroneous screenshot captures. Additional application interface 112 (e.g., SAPGUI) settings include selecting an option to keep the application interface 112 in a full screen mode to facilitate screenshot captures.

Running the source collection logic 110 may have an expected runtime. For example, running the source collection logic 110 for a single instance of the given source application 122 (e.g., a single SAP instance) may be expected to run for around 8 minutes. This time will increase with additional application servers or instances. To avoid disruption for screenshot captures (e.g., partial screenshot captures), manual activities by the end-user should be avoided during the runtime of the source collection logic 110. Further, the source collection logic 110 in some embodiments should be executed on just a single source application at a time (e.g., to avoid a mix-up of screenshots or other information capture from multiple source applications 122). Thus, the end-user should close other sessions (e.g., other SAP sessions) while the source collection logic 110 is run.

To execute the source collection logic 110, an end user will login to the system (e.g., source clouds 120) on which the given source application 122 whose information is to be collected runs. Where the given source application 122 is an SAP application, this may include logging in to the SAP system where the source collection logic 110 needs to be executed. The source collection logic 110 is client independent, and may be run as the source collection logic 110-C on the client devices 106, as the source collection logic 110-T on the target clouds 140, or on some other system. Next, a check is run to ensure that all system sessions are closed except for the one in which the source collection logic 110 is to be run.

If the source collection logic 110 is to be run within a Windows operating system, a script or other executable containing the functionality of the source collection logic 110 may be run (e.g., double-clicked or otherwise opened by the end-user). It is possible that opening the source collection logic 110 on some operating systems (e.g., Windows) may result in an error (e.g., indicating that the source collection logic 110 is an "unrecognized" application). If so, the end-user may select an option for enabling running of unrecognized or untrusted applications. For example, a Windows operating system may cause a pop-up to be displayed, allowing the user to select "Run anyway" or "Don't run" interface features. The end-user should select "Run anyway" to allow the source collection logic 110 to run.

Once the source collection logic 110 is run or otherwise opened, it will prompt the end-user to specify or confirm the choice of a target location for screenshots or other information that is captured or collected during execution of the source collection logic 110. The end-user should select a target path where the end-user has write access and enter an SID. Once such information is entered, the application interfaces 112 may display a notification indicating that the source collection logic 110 is attempting to access information associated with the given source application 122 via the application interfaces 112. Where the given source application 122 is an SAP application or system, the notification may indicate that the source collection logic 110 is attempting to access the SAPGUI. The end-user may confirm and allow such access, and then the source collection logic 110 will run, and capture and export data from the given source application 122 to the previously specified target path (e.g., a local directory). The source collection logic 110 may capture and export the data in one or more spreadsheets (e.g., Excel files). The application interfaces 112 (e.g., SAPGUI) may cause a security notification to be displayed indicating that the source collection logic 110 is attempting to create files in the specified directory. The end-user may activate user interface features of the security notification to allow this action (including an option to "remember" this decision). Depending on whether spreadsheet software (e.g., Excel) is installed on the server, there may be an additional security notification to allow the end-user to allow or deny opening or access to the file.

When the source collection logic 110 completes execution, a notification may be displayed indicating to the end-user the location of the output (e.g., the captured information for the given source application 122). The source collection logic 110 may then be run for additional ones of the source applications 122 (or multiple instances of the given source application 122), if desired. Once the source collection logic 110 is run for all desired source applications 122, the local directory or target path with the output may be packaged (e.g., the folder may be zipped or otherwise archived) and then transmitted to an entity that will use the captured information. For example, where the given source application 122 is to be migrated as one of the target applications 142 on the target clouds 140, the captured information may be transmitted from the client devices 106 to the target clouds 140, or from the client devices 106 and/or target clouds 140 to support personnel of the target CSP 104 to enable provisioning of the target applications 142 on the target clouds 140.

Figure 3:
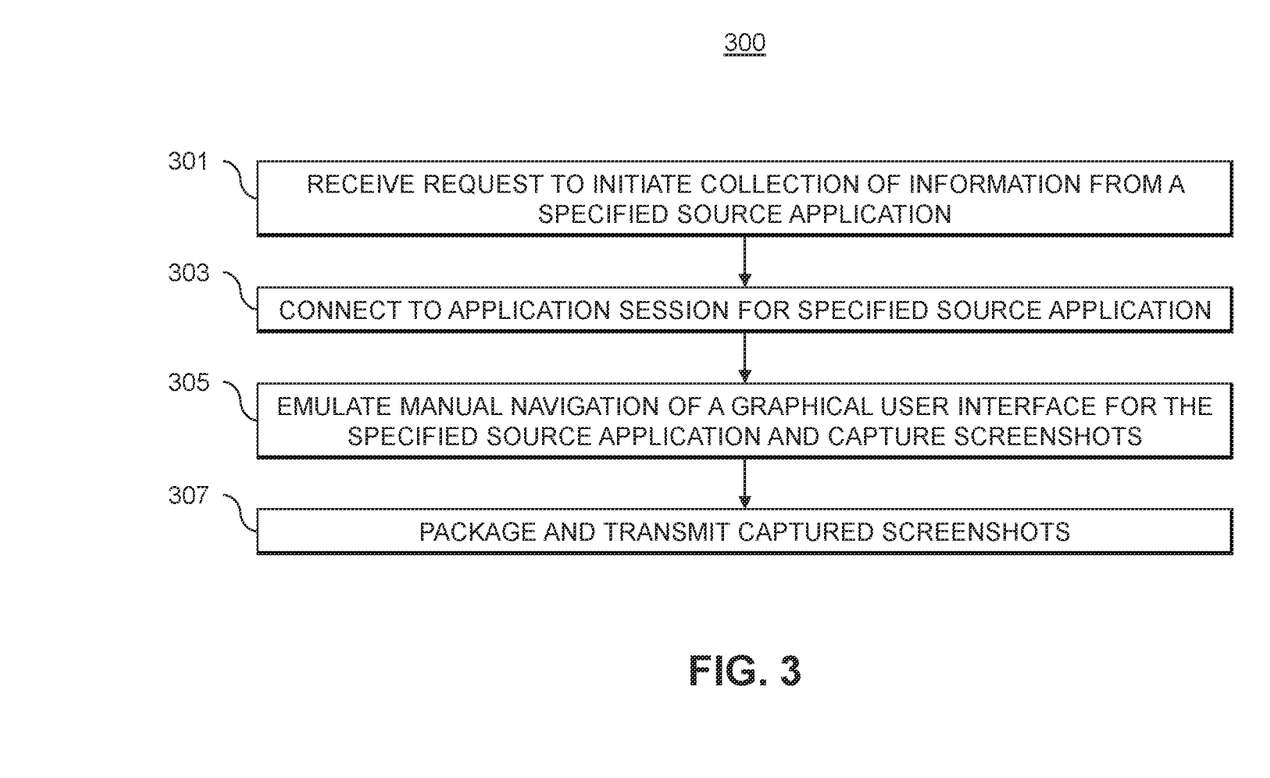
FIG. 3 is a process flow for collecting information from a specified source application in an illustrative embodiment.

FIG. 3 illustrates a process flow 300 for execution of the source collection logic 110. The process flow 300 begins in step 301 with receiving a request to initiation collection of information from a specified source application (e.g., one of the source applications 122). The request may specify various information, such as the source application from which information is to be collected, a target path where collected information is to be saved, access credentials for accessing the source application or interfaces thereof, etc. In step 303, the source collection logic 110 connects to an application session for the specified source application (e.g., using application interfaces 112). The source collection logic 110 in step 305 then emulates manual navigation of a GUI for the specified source application and captures screenshots of different views of the GUI containing portions of the information to be collected. In step 307, the captured screenshots are packaged and transmitted. The captured screenshots, for example, may be transmitted to an enterprise system that provides monitoring or other services to end-users of the specified source application, where the specified source application is outside the control of the enterprise system. In some cases, the information is transmitted so as to allow or enable migration of the specified source application to the enterprise system. This may include using portions of the captured information to provision a target application. In some embodiments, the target application comprises a same piece of software that is run at a separate site (e.g., on the target clouds 140 rather than on the source clouds 120). In other embodiments, the target application may comprise a piece of software that is different than the source application, but which provides similar functionality. For example, the source and target applications may be different versions of a piece of software offered by the same software vendor, may be pieces of software offered by two different software vendors, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for application management using information that is captured via emulating the execution of tasks in a GUI of an application will now be described in greater detail with reference to FIGS. 4 and 5. Although described in the context of system 100, these platforms may also be used to implement at least portions of other information processing systems in other embodiments.

Figure 4:
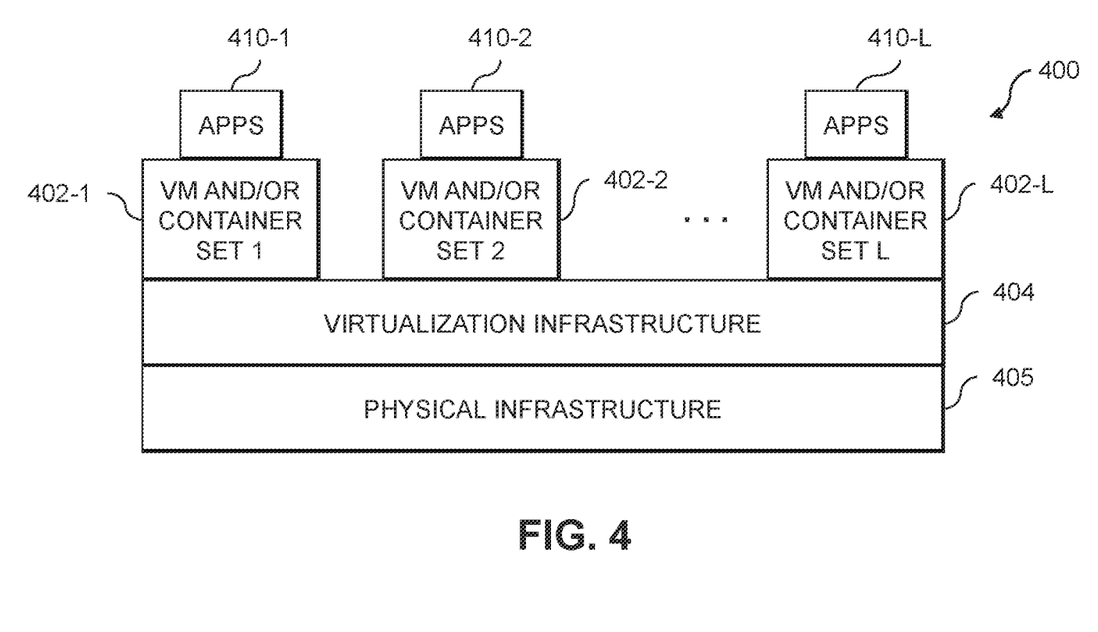
FIGS. 4 and 5 show examples of processing platforms that may be utilized to implement at least a portion of an information processing system in illustrative embodiments.
Figure 5:
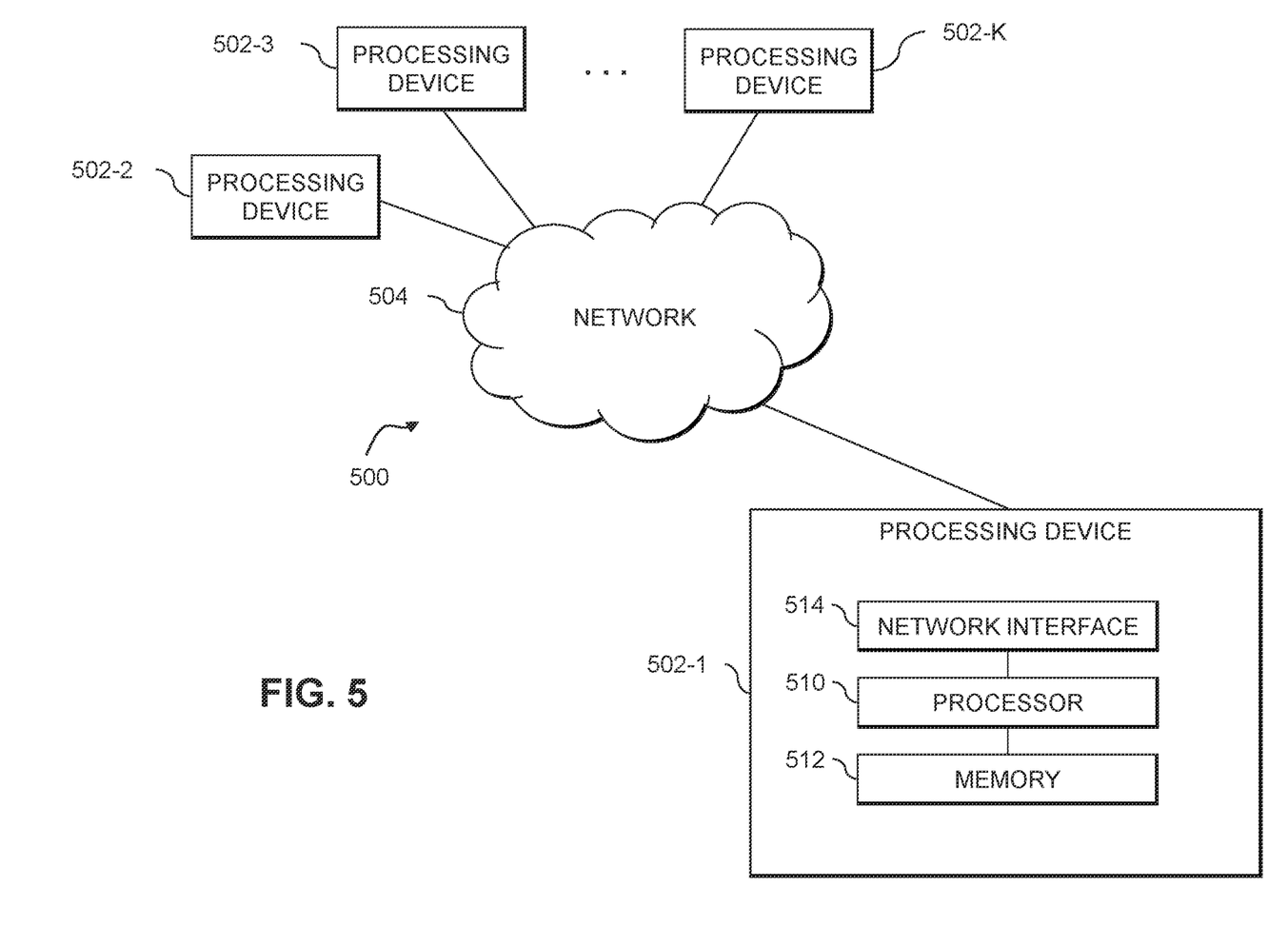

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application management using information that is captured via emulating the execution of tasks in a GUI of an application as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, applications, interfaces, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a request to collect configuration information for a source application;
establishing a connection to an application session associated with the source application;
emulating, via the application session associated with the source application, execution of two or more tasks in the source application, wherein emulating the execution of at least one of the two or more tasks comprises automatically navigating to two or more views of a graphical user interface of the source application and executing at least one function that updates an output of each of the two or more views;
capturing, from the output of each of the two or more views, two or more portions of the configuration information for the source application; and
performing one or more management actions for the source application utilizing the captured two or more portions of the configuration information for the source application;
wherein emulating the execution of the two or more tasks in the source application comprises emulating execution of a sequence of two or more transaction codes via the application session associated with the source application, the two or more transaction codes causing the graphical user interface of the source application to automatically navigate to the two or more views while bypassing one or more menus of the graphical user interface of the source application.

2. The apparatus of claim 1 wherein the source application comprises a plurality of instances operating on respective ones of a plurality of application servers, and wherein emulating the execution of the two or more tasks in the source application comprises emulating the execution of at least a given one of the two or more tasks on each of the plurality of application servers.

3. The apparatus of claim 1 wherein the request specifies at least one of:
a target path where the configuration information for the source application is to be saved; and
access credentials for the source application.

4. The apparatus of claim 1 wherein establishing the connection to the application session associated with the source application comprises utilizing one or more scripting libraries associated with the graphical user interface of the source application.

5. The apparatus of claim 1 wherein capturing the two or more portions of the configuration information for the source application from the output of each of the two or more views comprises capturing screenshots of each of the two or more views.

6. The apparatus of claim 5 wherein establishing the connection to the application session associated with the source application comprises configuring one or more parameters of the application session that maintain the graphical user interface of the source application in a full screen mode for capturing the screenshots.

7. The apparatus of claim 5 wherein establishing the connection to the application session associated with the source application comprises configuring one or more parameters of the application session that select a graphical theme of the graphical user interface of the source application that facilitates capturing the screenshots.

8. The apparatus of claim 1 wherein establishing the connection to the application session associated with the source application comprises closing any other existing application sessions associated the source application.

9. The apparatus of claim 1 wherein performing one or more management actions for the source application utilizing the captured two or more portions of the configuration information for the source application comprises transmitting the captured two or more portions of the configuration information to a support platform providing support services for the source application.

10. The apparatus of claim 1 wherein performing one or more management actions for the source application utilizing the captured two or more portions of the configuration information for the source application comprises performing migration of the source application from a source computing resource to a target computing resource.

11. The apparatus of claim 10 wherein the source computing resource comprises a first cloud operated by a first cloud service provider and the target computing resource comprises a second cloud operated by a second cloud service provider.

12. The apparatus of claim 1 wherein performing one or more management actions for the source application utilizing the captured two or more portions of the configuration information for the source application comprises provisioning a target application at a target computing resource.

13. The apparatus of claim 12 wherein the source application comprises a first piece of software and the target application comprises a second piece of software different than the first piece of software.

14. The apparatus of claim 1 wherein the at least one processing device is further configured to perform the step of capturing at least one additional portion of the configuration from the source application from one or more tables maintained by the source application.

15. A computer program product comprising a non-transitory processor-readable storage medium having stored therein program code of one or more software programs, wherein the program code when executed by at least one processing device causes the at least one processing device to perform steps of:
receiving a request to collect configuration information for a source application;
establishing a connection to an application session associated with the source application;
emulating, via the application session associated with the source application, execution of two or more tasks in the source application, wherein emulating the execution of at least one of the two or more tasks comprises automatically navigating to two or more views of a graphical user interface of the source application and executing at least one function that updates an output of each of the two or more views;
capturing, from the output of each of the two or more views, two or more portions of the configuration information for the source application; and
performing one or more management actions for the source application utilizing the captured two or more portions of the configuration information for the source application;
wherein emulating the execution of the two or more tasks in the source application comprises emulating execution of a sequence of two or more transaction codes via the application session associated with the source application, the two or more transaction codes causing the graphical user interface of the source application to automatically navigate to the two or more views while bypassing one or more menus of the graphical user interface of the source application.

16. The computer program product of claim 15 wherein capturing the two or more portions of the configuration information for the source application from the output of each of the two or more views comprises capturing screenshots of each of the two or more views.

17. The computer program product of claim 15 wherein performing one or more management actions for the source application utilizing the captured two or more portions of the configuration information for the source application comprises at least one of performing migration of the source application from a source computing resource to a target computing resource and provisioning a target application at the target computing resource.

18. A method comprising:
receiving a request to collect configuration information for a source application;
establishing a connection to an application session associated with the source application;
emulating, via the application session associated with the source application, execution of two or more tasks in the source application, wherein emulating the execution of at least one of the two or more tasks comprises automatically navigating to two or more views of a graphical user interface of the source application and executing at least one function that updates an output of each of the two or more views;

capturing, from the output of each of the two or more views, two or more portions of the configuration information for the source application; and performing one or more management actions for the source application utilizing the captured two or more portions of the configuration information for the source application;

wherein emulating the execution of the two or more tasks in the source application comprises emulating execution of a sequence of two or more transaction codes via the application session associated with the source application, the two or more transaction codes causing the graphical user interface of the source application to automatically navigate to the two or more views while bypassing one or more menus of the graphical user interface of the source application; and wherein the method is performed by at least one processing device comprising a processor coupled to a memory.

19. The method of claim 18 wherein capturing the two or more portions of the configuration information for the source application from the output of each of the two or more views comprises capturing screenshots of each of the two or more views.

20. The method of claim 18 wherein performing one or more management actions for the source application utilizing the captured two or more portions of the configuration information for the source application comprises at least one of performing migration of the source application from a source computing resource to a target computing resource and provisioning a target application at the target computing resource.

* * * * *